United States Patent [19]
Hentz et al.

[11] 3,766,460
[45] Oct. 16, 1973

[54] MANUAL CONTROL SYSTEM FOR NUMERICALLY CONTROLLED MACHINE

[75] Inventors: Thomas E. Hentz, Cincinnati; Robert K. Burroughs, Batavia, both of Ohio

[73] Assignee: LeBlond Inc., Cinicinnati, Ohio

[22] Filed: May 3, 1972

[21] Appl. No.: 250,076

[52] U.S. Cl. ............ 318/571, 318/39, 318/605, 318/661
[51] Int. Cl. ........................................ G05b 11/18
[58] Field of Search ............... 318/628, 571, 575, 318/590, 591, 605, 628, 661, 39

[56] References Cited
UNITED STATES PATENTS

| | | | |
|---|---|---|---|
| 2,475,484 | 7/1949 | Nise | 318/628 |
| 2,750,545 | 6/1956 | Davis | 318/661 |
| 3,156,438 | 11/1964 | Diller et al. | 318/628 X |
| 3,173,001 | 4/1965 | Evans | 235/154 |
| 3,576,535 | 4/1971 | Turner | 318/591 X |
| 3,686,556 | 8/1922 | Anger | 318/605 X |

Primary Examiner—B. Dobeck
Attorney—James S. Hight et al.

[57] ABSTRACT

A manual control system including a powered feed for a numerically controlled machine tool. The system includes a manually operable differential resolver located in the position feedback loop of the servo control system for each slide and a variable speed motor for driving that differential resolver at a controlled rate so as to effect controlled feeding movement of the slides independent of the numerical control unit.

28 Claims, 2 Drawing Figures

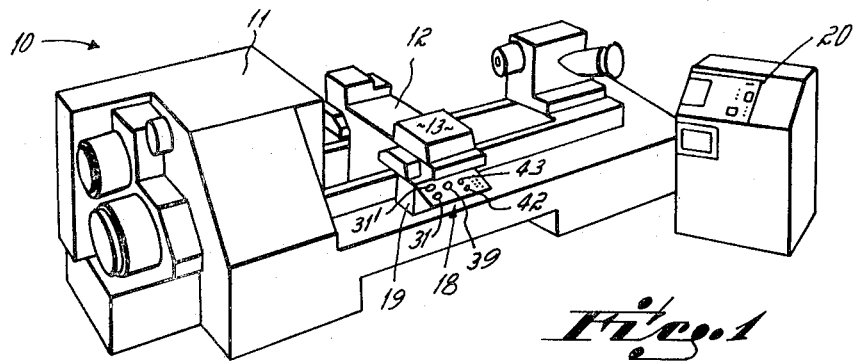
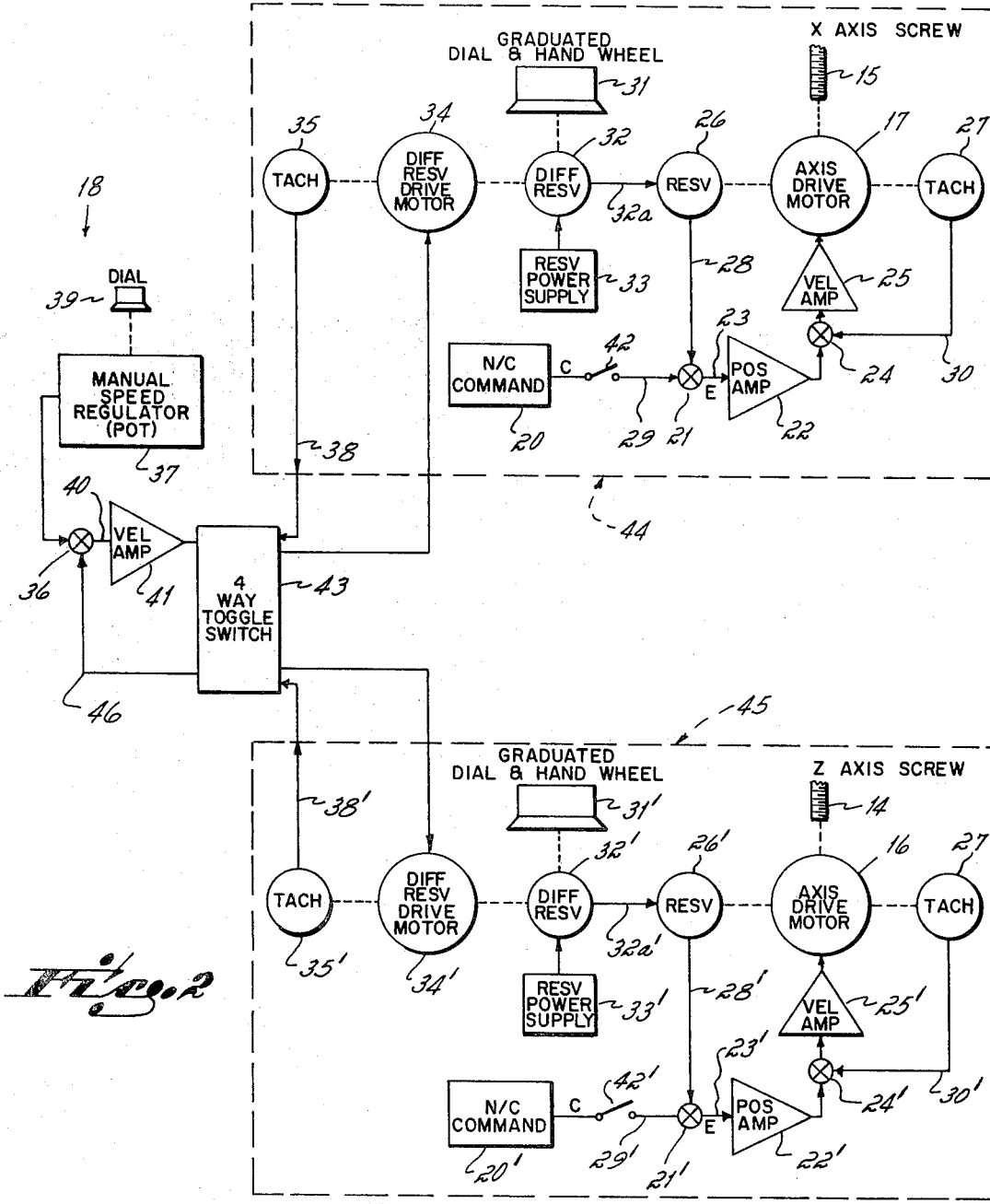

MANUAL CONTROL SYSTEM FOR NUMERICALLY CONTROLLED MACHINE

This invention relates to automatically controlled equipment and particularly to numerically controlled machine tools.

Numerically controlled machines are controlled from a program, usually in the form of a tape or a programmed card. In addition to the programmed source of machine control, most numerical controlled machines also have a manual data input through which programmed information may be supplied to the machine for single cycle operation or for machine setup. However, the input of data through the manual data input requires that the information be supplied to the machine through the numerical control unit and that in turn requires that the person putting the data into the control unit be a programmer. In other words, the machine operator who desires to cycle the machine through a single cycle without programming a tape or card must supply the manual data input to the control unit in the same form and in the same sequence as it is supplied to the unit by the tape and consequently that operator must have all the skills of a machine programmer. Unfortunately, most machine operators do not have a programming skill and therefore cannot operate numerically controlled machines except through a programmed drive. But there is often a need for a numerical control machine to be operated through a single cycle, as for example, to machine soft jaws of a chuck during setup of a machine preparatory to cycling of the machine under the control of a programmed tape or card.

At the present time many numerically controlled machines have, in addition to the manual data input control, some manually operated mechanism for positioning a slide of the machine during machine setup. Quite often this manual positioning comprises a dial operated differential resolver in the positioning feedback loop of the slide control servo system. When the dial is manually rotated, it effects corresponding displacement of the slide. However, that manual rotation of the graduated dial effects slide movement at very nearly exactly the same rate as the dial is rotated. Consequently, it is impractical to use it to control slide movement velocity or in the case of a machine tool, to control machine feed rates. Therefore, even machines which are equipped with auxiliary positioning input independently of the programmed control unit still require manual data input at the control unit whenever the machine is to be cycled through a single machining cycle or whenever the slide is to be moved at a controlled speed.

It has therefore been one objective of this invention to provide a manual control of a machine slide on a numerically controlled machine which controls not only positioning but rate of movement or feed completely independently of the control unit. Expressed another way, it has been an objective of this invention to provide a control system for a numerically controlled machine which enables an operator to effect slide movement at a feed rate or velocity selectable by the operator using a calibrated manual control knob at the machine. This enables the machine operator to operate the machine in the exact same manner as if the machine had no numerical control unit. Consequently, any operator who knows absolutely nothing about machine programming but who has learned how to operate a similar machine manually is able to operate a numerically controlled machine equipped with the invention of this application.

The system which accomplishes these objectives comprises a manually operable differential resolver located in the position feedback loop of the machine servo control system and a variable speed motor for driving that differential resolver. In the preferred embodiment the variable speed motor is located in a servo loop which includes a tachometer and a manually operable speed control potentiometer so that the rate at which the variable speed motor drives the differential resolver may be very accurately controlled.

The primary advantage of this invention is that it provides a very inexpensive manually operable feed rate control for a machine tool slide of a numerically controlled machine. The addition of this inexpensive manual feed rate control enables any operator capable of operating a similar machine without numerical controls to operate this numerically controlled machine. Consequently, a numerically controlled machine with this manual position and feed rate control is useful as both a manual controlled machine and as a numerically controlled machine and may be easily and quickly switched between such uses.

These and other objects and advantages of this invention will be more readily apparent from the following description of the drawings in which:

FIG. 1 is a perspective view of a lathe incorporating the invention of this application; and FIG. 2 is a block diagram of the electrical control system for the lathe of FIG. 1.

Referring first to FIG. 1, there is shown a typical machine 10 of the type to which the invention of this application is applicable. In the preferred embodiment, the machine is a lathe although the invention of this application is applicable to any programmable machine but is particularly adaptable to metal cutting or forming machines. The lathe 10 includes a headstock 11 having a chuck (not shown) attached to the headstock spindle for holding and rotating a workpiece. The lathe further includes a longitudinally movable carriage 12 which supports and carries a slide 13 movable toward and away from a workpiece. The slide 13 in turn carries a tool which follows the longitudinal movements of the carriage 12 and the transverse movements of the slide 13, these directions being designated as the Z and X directions respectively. Motion along the Z axis is typically provided by rotation of a carriage lead screw 14 (FIG. 2) while motion along the X axis is typically provided by rotating a cross feed screw 15 (FIG. 2). The lead screw 14 is driven by a feed motor 16 while the cross feed screw 15 is driven by a second feed motor 17.

Referring now to FIG. 2 and the block diagram of the control system used to control the lathe 10, it will be seen that the lathe control system has been divided into two sections 44, 45, one for the control of each of the X and Z axes. Since the two controls are identical, only one (that which controls the X axis) will be described in detail except where a discussion of the equipment of both coordinates is required for clarification. For purposes of identification the control equipment for the Z axis has been given the same numerical designation as the corresponding equipment for the X axis except that the Z axis control equipment is designated by a numeral followed by a prime mark.

Essentially, the X axis motor control system 44 includes a servo loop for controlling both the position and velocity of screw 15 rotation. A command signal for controlling both position and velocity is derived from the numerical control unit 20. Suitable control units are commercially available for operation in this circuit. One such suitable control circuit is described in U.S. Pat. No. 3,173,001 issued Mar. 9, 1965 to J.T. Evans. That command signal is supplied to a position summing point or comparator 21 out of which an error signal E is supplied to a position amplifier 22 on lead 23. The output of that amplifier 22 is then supplied through a velocity summing point or velocity comparator 24 and a velocity amplifier 25 to the main servo feed motor 17. The feed motor 17 is mechanically connected to an electrical resolver 26 and a tachometer 27. The resolver 26 is connected in a primary feedback loop via lead 28 to the summing point comparator 21 such that the error signal on lead 23 represents the difference between the command reference signal C on lead 29 and the primary feedback signal on lead 28. The tachometer 27 also gives rise to a feedback signal on lead 30 to the summing comparator 24 of the velocity loop so that the velocity signal out of the comparator 24 represents the difference between the actual motor speed and the commanded motor speed. Both the velocity and position servo loop are conventional in motor control circuits and both are described in the above-identified issued patent.

The invention of this application is concerned with a supplemented control system for enabling the servo feed motor 17 to be manually controlled from position control dials 31, 31', a velocity control dial 39, and switching controls 18 on the the apron 19 of the machine completely independently of the numerical control unit 20. To this end a differential resolver 32 is connected between the resolver power supply 33 and the resolver 26. The rotor of this differential resolver 32 is mechanically connected to the position control dial 31 on the apron 19 of the lathe 10 such that rotation of the dial effects rotation of the rotor of the differential resolver 32 and thereby effects an auxiliary input on lead 32a to the resolver 26 and subsequently to the summing point or comparator 21 of the position control loop. Consequently, manual rotation of the graduated position control dial 31 may be used to effect displacement of the servo feed motor 17 and corresponding linear movement of the slide 13. Generally, this graduated dial 31 is used in machine setup to position the slide 13 in some zero position preparatory to the initiation of a numerically controlled machine cycle. This manual input to the machine by the dial 31 is suitable for positioning the slide preparatory to a cutting operation but is unsuitable for operation when cutting because the rate of dial rotation determines the speed or slide movement. It is very nearly impossible to manually rotate the graduated dial 31 at a rate which is suitable for feeding a cutting tool into a workpiece.

To control the speed of slide movement and thereby enable the manual controls on the apron 19 of the machine to be used for controlling both feed rate (speed) and position, a variable speed drive motor 34 is drivingly connected to the differential resolver 32 and the machanically connected graduated dial 31. This motor is operable to drive the rotor of the differential resolver 32 and thereby effect slide movement at a preselected speed. To accurately control the speed of the drive motor 34, it is connected in a servo loop which includes a tachometer 35 and a comparator 36 together with a speed potentiometer 37. The tachometer 35 is mechanically connected to the drive shaft of the drive motor 34 and is operable to supply a feedback signal via lead 38, through a 4-way switch 43 and lead 46 to the comparator 36. A command signal is suppled to this comparator 36 from the speed control potentiometer 37, the setting of which is controlled by a control dial 39 located on the apron 19 of the machine. The comparator 36 supplies an output error signal on lead 40 to a velocity amplifier 41, the output of which then is used to drive either the motor 34 or motor 34', depending upon the setting of the toggle switch 43, at a rate set into the graduated dial 39. The speed control potentiometer dial 39 may be either graduated in terms of inches per minute or inches per revolution of the tool spindle, dependent upon the application of the system.

In addition to the position control dials 31, 31' and the feed (speed) control dial 39 on the apron of the machine, there is a selector switch 42 for selecting either manual or programmed automatic control and a 4-position axis and direction control "joy stick" type of 4-way toggle switch 43. The switch 42 has the effect of holding or "freezing" the command signal C on line 29 so that the only active position command signal is that derived from the differential resolver 32. The 4-way "joy stick" switch 43 enables the axis, X or Z, to be selected at the apron as well as the direction in which the slide will move along that axis when under the control of the speed setting dial 39.

The use of the drive motor 34 for effecting rotation of the rotor of the differential resolver 32 and the location of the speed and position setting controls on the apron 19 of the machine enable the machine to be operated in exactly the same manner as lathes or other machine tools are operated which do not incorporate numerical control. Consequently, the auxiliary manual control of this invention enables the machine operator to interrupt the numerical control unit 20, place the machine in manual control mode, select the axis and direction of slide movement via the 4-way switch 43 and operate the machine in exactly the same way as similar nonnumerically controlled machines have always been controlled. Consequently, an old machine operator, no matter how resistant to change, can now operate this numerically controlled machine without knowing a single thing about machine programming.

The primary advantage of this invention is that it enables a lathe or machine tool to be used in either manual mode of operation or in numerical mode of control. Consequently, the single machine functions both as a conventional machine for machining single workpieces or a numerically controlled machine for machining parts in accordance with a program schedule.

While I have described only a single preferred embodiment of my invention, those persons skilled in the art to which this invention pertains will appreciate numerous changes and modifications which may be made without departing from the spirit of my invention. Therefore, I do not intend to be limited except by the scope of the appended claims.

Having described my invention, I claim:

1. For use in combination with a numerically programmable machine having a slide and a motor for effecting movement of said slide, a control system for controlling energization of said motor, said control system comprising
  a first source of programmable position and velocity command signals,
  a comparator,
  means for supplying a programmed command signal from said first source of command signals to said comparator,
  means for supplying an error signal from said comparator to said motor,
  a feedback signal generator,
  means for supplying a feedback signal from said feedback signal generator to said comparator such that said error signal is representative of the difference between said command signal and said feedback signal,
  a second source of unprogrammed position control signals,
  means for supplying position control signals from said second source to said comparator, and
  the improvement which comprises
  variable speed motor means for driving said second source of position control signals at a controlled rate so as to control the velocity of slide movement when said slide is under the control of said second source of unprogrammed position control signals.

2. For use in combination with a numerically programmable machine having a slide and a motor for effecting movement of said slide, a control system for controlling energization of said motor, said control system comprising
  a first source of programmable position and velocity command signals,
  a comparator,
  means for supplying a command signal from a said first source of command signals to said comparator,
  means for supplying an error signal from said comparator to said motor,
  a feedback signal generator,
  means for supplying a feedback signal from said feedback signal generator to said comparator such that said error signal is representative of the difference between said command signal and said feedback signal,
  a second manually actuated source of unprogrammed position control signals,
  means for supplying position control signals from said second source to said comparator, and
  the improvement which comprises
  variable speed motor means for driving said second source of unprogrammed position control signals at a controlled rate so as to control the velocity of slide movement when said slide is under the control of said second source of position control signals.

3. For use in combination with a numerically programmable machine having a slide and a motor for effecting movement of said slide, a control system for controlling energization of said motor, said control system comprising
  a first source of programmed position command signals,
  a comparator,
  means for supplying a command signal from a said first source of command signals to said comparator,
  means for supplying an error signal from said comparator to said motor,
  a resolver for generating a feedback signal,
  means for supplying said feedback signal from said resolver to said comparator such that said error signal is representative of the difference between said command signal and said feedback signal,
  a manually setable differential resolver for generating unprogrammed control signals,
  means for supplying said unprogrammed control signals from said differential resolver to said comparator, and the improvement which comprises
  variable speed motor means for driving said differential resolver at a controlled rate so as to control the velocity of slide movement when said slide is under the control of unprogrammed control signals.

4. The control system of claim 3 in which said differential resolver is electrically connected in a feedback loop between said resolver and said comparator.

5. The control system of claim 3 in which said differential resolver comprises a stator and a rotor, said rotor being mechanically connected to a manually rotatable position control dial.

6. The control system of claim 3 in which said variable speed motor is connected to a manually setable speed control setting means.

7. The control system of claim 3 in which said variable speed motor is connected through a closed servo loop with a manually setable speed control setting means.

8. The control system of claim 7 in which said closed servo loop includes a tachometer mechanically connected to said variable speed motor, a source of command speed control signals, and a comparator for generating an error signal representative of the difference between the command speed control signal and the actual speed of said variable speed motor as measured at said tachometer.

9. For use in combination with a numerically controlled machine tool having a pair of slides movable along mutually perpendicular axes and a pair of independently operable motors for effecting movement of said slides, a numerical control system for controlling energization of said motors, said control system comprising
  a first source of programmable position and velocity command signals for each of said motors,
  a pair of comparators, one of said comparators being in a control circuit for each of said motors,
  means in each of said circuits for supplying a programmed command signal from said first source of command signals to each of said comparators,
  means in each of said circuits for supplying an error signal from said comparator to the motor controlled by said circuit,
  a feedback signal generator in each of said control circuits,
  means in each of said circuits for supplying a feedback signal from said feedback signal generator to said comparator such that said error signal is representative of the difference between said command signal and said feedback signal,
  a second source of unprogrammed position control signals in each of said circuits,
  means in each of said circuits for supplying position control signals from said second source to the comparator in said circuit, and the improvement which comprises
variable speed motor means in each of said circuits for driving said second source of position control signals at a controlled rate so as to control the velocity of slide movement when that slide is under the control of said second source of unprogrammed position control signals.

10. The control circuit of claim 9 in which said second source of unprogrammed position control signals is manually movable.

11. The control circuit of claim 9 in which said feedback signal generator is a resolver and said second source of unprogrammed position control signals is a differential resolver in series connection with said resolver.

12. The control system of claim 11 in which said differential resolver is electrically connected in a feedback loop between said resolver and said comparator.

13. The control system of claim 11 in which said differential resolver comprises a stator and a rotor, said rotor being mechanically connected to a manually rotatable position control dial.

14. The control system of claim 11 in which said variable speed motor is connected to a manually setable speed control setting means.

15. The control system of claim 11 in which said variable speed motor is connected through a closed servo loop with a manually setable speed control setting means.

16. The control system of claim 15 in which said closed servo loop includes a tachometer mechanically connected to said variable speed motor, a source of command speed control signals, and a comparator for generating an error signal representative of the difference between the command speed control signal and the actual speed of said variable speed motor as measured at said tachometer.

17. A manual control system for a numerically controlled machine tool, which machine tool has a movable slide, a motor for effecting movement of said slide, a servo system including a feedback loop for controlling said motor, and a numerical control unit for supplying command input information to said servo system, said manual control system comprising
a differential resolver located in the position feedback loop of the servo control system, and
a manually settable variable speed motor for driving said differential resolver at a controlled rate so as to effect controlled feeding movement of said slide independently of the numerical control unit.

18. The manual control system of claim 17 in which said differential resolver is connected to a manually movable position control dial for effecting manual positioning of said slide.

19. The control system of claim 17 in which said differential resolver comprises a stator and a rotor, said rotor being mechanically connected to a manually rotatable position control dial.

20. The control system of claim 17 in which said variable speed motor is connected to a manually setable speed control setting means.

21. The control system of claim 17 in which said variable speed motor is connected through a closed servo loop with a manually setable speed control setting means.

22. The control system of claim 21 in which said closed servo loop includes a tachometer mechanically connected to said variable speed motor, a source of command speed control signals, and a comparator for generating an error signal representative of the difference between the command speed control signal and the actual speed of said variable speed motor as measured at said tachometer.

23. A manual control system for a numerically controlled machine tool, which machine tool has movable slides, motors for effecting movement of said slides, servo systems including feedback loops for controlling said motors, and a numerical control unit for supplying command input information to said servo systems, said manual control system comprising
differential resolvers located in the position feedback loops of the servo control systems, and
manually settable variable speed motors for driving said differential resolvers at controlled rates so as to effect controlled feeding movement of said slides independently of the numerical control unit.

24. For use in combination with a numerically programmable machine having a slide and a motor for effecting movement of said slide, a control system for controlling energization of said motor, said control system comprising
a first source of programmable position and velocity command signals,
a comparator,
means for supplying a programmed command signal from said first source of command signals to said comparator,
means for supplying an error signal from said comparator to said motor,
a feedback signal generator,
means for supplying a feedback signal from said feedback signal generator to said comparator such that said error signal is representative of the difference between said command signal and said feedback signal,
manually controllable position means for generating position control signals without the use of program format information, said manually controllable position means including a graduated dial for input of manual position commands and for reading out slide position when said slide is under the control of said manually controllable position means,
means for supplying position control signals from said manually controllable means to said comparator, and
manually controllable velocity means for driving said motor at a controlled velocity without the use of program format information, said manually controllable velocity means being operatively connected to said graduated dial of said manually controllable position means so that said graduated dial remains synchronized with slide movement when said slide is under the control of said manually controllable velocity means.

25. The control system of claim 24 in which said manually controllable position means includes a differential resolver.

26. The control system of claim 25 in which said differential resolver is electrically connected in a feedback loop between said resolver and said comparator.

27. The control system of claim 25 in which said differential resolver comprises a stator and a rotor, said rotor being mechanically connected to a manually rotatable position control dial.

28. A control system for a numerically controlled machine tool which has a movable slide, said control system including a motor for effecting movement of said slide, a servo system including a feedback loop for controlling said motor, a numerical control unit for supplying program format command input information to said servo system and a manual control system, said manual control system comprising manually controllable position means for generating position control signals without the use of program format information, said manually controllable means including a graduated dial for input of position commands and for reading out slide position when said slide is under the control of said manually controllable position means, means for supplying position control signals from said manually controllable means to said servo system, and manually controllable velocity means for driving said motor at a controlled velocity without the use of program format information, said manually controllable velocity means being operatively connected to said graduated dial so that said graduated dial remains synchronized with slide movement when said slide is under the control of said manually controllable velocity means.

* * * * *